UNITED STATES PATENT OFFICE.

OTTO HANSMANN, OF BERLIN, GERMANY, ASSIGNOR TO THE ACTIEN-GESELLSCHAFT FÜR ANILIN FABRIKATION, OF SAME PLACE.

BROWN SULFUR DYE.

SPECIFICATION forming part of Letters Patent No. 640,559, dated January 2, 1900.

Application filed October 5, 1899. Serial No. 732,699. (No specimens.)

*To all whom it may concern:*

Be it known that I, OTTO HANSMANN, of Berlin, in the Kingdom of Prussia, German Empire, have invented new and useful Improvements in the Production of Brown Dye; and I do hereby declare that the following is a full, clear, and exact description thereof, which will enable others skilled in the art to which it appertains to make and use the same.

I have discovered that a new valuable brown coloring-matter is produced by heating with sulfur and sulfids of alkalis the condensation product obtained by the action of para-nitrochlorobenzene-ortho-monosulfonic acid upon meta-toluylenediamin. This condensation product, which serves as starting material for the preparation of my new dye, may be obtained by heating twenty-six parts, by weight, of the sodium salt of para-nitrochlorobenzene-ortho-monosulfonic acid,

$$Cl:SO_3H:NO_2 = 1:2:4,$$

with 12.2 parts of meta-toluylenediamin, three hundred parts of water, and about six parts of calcium carbonate in a vessel connected with reflux condenser until no more carbonic acid is given off. The reaction product thus obtained is filtered and the nitrosulfonic acid formed is precipitated from the filtrate by addition of a mineral acid. It constitutes a yellow precipitate, little soluble in cold water, pretty soluble in hot water, and dissolving in alkalis with brown-yellow color. In concentrated sulfuric acid this condensation product dissolves with brown color, the solution turning dirty red on heating.

In order to carry out my invention, twenty parts, by weight, of the condensation product above described, sixty parts of sodium sulfid, and twenty parts of sulfur are heated at 180° centigrade to about 200° centigrade until a sample taken from the mass does not show any further increase in the formation of coloring-matter. The product which is then almost dry is powdered, and the powder obtained can be directly employed for dyeing.

The new dyestuff dissolves in water with brown color, the aqueous solution remains almost unchanged on addition of caustic-soda lye, while mineral acids produce in the same a brown precipitate. The dyestuff dissolves in concentrated sulfuric acid with a dirty and brownish-violet red color. On addition of ice-water to this solution a brown precipitate is formed. The dyestuff is slightly soluble in alcohol with brown color. It dyes unmordanted cotton dark-brown shades, which by subsequent treatment with a mixture of copper sulfate and potassium bichromate are turned bronze.

Having now described my invention and in what manner the same can be performed, what I claim as new is—

The brown dye which results from heating with sulfur and sulfids of alkalis the condensation product formed by the action of para-nitrochlorobenzene-ortho-monosulfonic acid upon meta-toluylendiamin, said dye forming a brown-black powder, soluble in water, yielding a brown solution which remains almost unchanged on addition of caustic-soda lye and in which mineral acids produce a brown precipitate, the dyestuff dissolving in concentrated sulfuric acid with a dirty and brownish violet-red color, ice-water producing in this solution a brown precipitate; the dyestuff being slightly soluble in alcohol with brown color, dyeing unmordanted cotton dark-brown shades, which by subsequent treatment with a mixture of copper sulfate and potassium bichromate are turned bronze.

In witness whereof I have hereunto signed my name, this 23d day of September, 1899, in the presence of two subscribing witnesses.

OTTO HANSMANN.

Witnesses:
WOLDEMAR HAUPT,
HENRY HASPER.